(12) United States Patent
Isami

(10) Patent No.: US 11,300,164 B2
(45) Date of Patent: Apr. 12, 2022

(54) CONTROL DEVICE FOR ENGAGEMENT MECHANISM

(71) Applicant: TOYOTA JIDOSHA KABUSHIKI KAISHA, Aichi-ken (JP)

(72) Inventor: Yoichiro Isami, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/224,126

(22) Filed: Apr. 7, 2021

(65) Prior Publication Data

US 2021/0372488 A1   Dec. 2, 2021

(30) Foreign Application Priority Data

Jun. 2, 2020  (JP) .............................. JP2020-095913

(51) Int. Cl.
| | |
|---|---|
| *F16D 11/14* | (2006.01) |
| *F16D 23/10* | (2006.01) |
| *B60K 6/387* | (2007.10) |
| *F16D 48/06* | (2006.01) |

(52) U.S. Cl.
CPC .............. *F16D 23/10* (2013.01); *B60K 6/387* (2013.01); *F16D 11/14* (2013.01); *F16D 48/06* (2013.01); *F16D 2500/10412* (2013.01); *F16D 2500/10462* (2013.01); *F16D 2500/1107* (2013.01)

(58) Field of Classification Search
CPC .......... F16D 23/10; F16D 11/14; F16D 48/06; F16D 2500/10412; F16D 2500/10462; F16D 2500/1107; B60K 6/387
See application file for complete search history.

(56) References Cited

U.S. PATENT DOCUMENTS

| | | | | |
|---|---|---|---|---|
| 11,047,429 | B2* | 6/2021 | Nose ...................... | B60K 17/02 |
| 2018/0119750 | A1* | 5/2018 | Yoshimura .............. | F16D 21/04 |
| 2018/0281593 | A1* | 10/2018 | Yuasa .................... | F16D 48/064 |
| 2018/0370356 | A1* | 12/2018 | Shigeta ................... | F16D 23/02 |

FOREIGN PATENT DOCUMENTS

| | | |
|---|---|---|
| JP | 2009222102 A | 10/2009 |
| JP | 202075553 A | 5/2020 |

* cited by examiner

*Primary Examiner* — David J Hlavka
(74) *Attorney, Agent, or Firm* — Hauptman Ham, LLP

(57) ABSTRACT

A control device includes: an engagement mechanism having a first engagement element and a second engagement element; and an actuator that generates a thrust that brings the first engagement element and the second engagement element close to each other when the engagement mechanism is engaged. The control device performs engagement with the thrust of the actuator when a differential rotation speed of the engagement mechanism is less than a predetermined value. In the control device, a parameter indicating an operating state of the actuator is detected, a target differential rotation speed is calculated in accordance with a value of the detected parameter, and the differential rotation speed is controlled to the calculated target differential rotation speed.

8 Claims, 12 Drawing Sheets

FIG. 4

| TRAVELING MODE | | CL1 | CL2 | B1 | MG1 | MG2 | ENG |
|---|---|---|---|---|---|---|---|
| HV TRAVELING MODE | HV-Lo MODE | ● | – | – | G | M | ON |
| | HV-Hi MODE | – | ● | – | G | M | ON |
| | DIRECT COUPLING MODE | ● | ● | – | | M | ON |
| EV TRAVELING MODE | DUAL MODE / EV-Lo MODE | – | – | ● | M | M | OFF |
| | DUAL MODE / EV-Hi MODE | – | ● | ● | M | M | OFF |
| | SINGLE MODE | – | – | – | | M | OFF |

CONTROL DEVICE FOR ENGAGEMENT MECHANISM

CROSS-REFERENCE TO RELATED APPLICATION

This application claims priority to Japanese Patent Application No. 2020-095913 filed on Jun. 2, 2020, incorporated herein by reference in its entirety.

BACKGROUND

1. Technical Field

The present disclosure relates to a control device for an engagement mechanism that is used in a vehicle power transmission device that transmits torque output from a driving force source to drive wheels.

2. Description of Related Art

Japanese Unexamined Patent Application Publication No. 2009-222102 (JP 2009-222102 A) describes a vehicle control device provided with a meshing clutch. The control device described in JP 2009-222102 A includes a first engagement member (input side member) and a second engagement member (output side member) constituting a meshing clutch, an actuator that engages and disengages the teeth of the first engagement member and the teeth of the second engagement member, an engagement starting unit that gives a command to start engagement to the actuator, and a torque application unit that applies torque in a direction of suppressing rotation of the first engagement member after the actuator is activated. When the difference in rotation speed between the first engagement member and the second engagement member is equal to or less than a predetermined rotation speed, the actuator is activated, and after the actuator is activated, the rotation change of the first engagement member is suppressed.

Further, Japanese Unexamined Patent Application Publication No. 2020-075553 (JP 2020-075553 A) describes a hybrid vehicle including an engine and a motor as driving force sources. This hybrid vehicle is equipped with a power split device having a plurality of rotating elements. Specifically, the power split device has two sets of planetary gear mechanisms, the engine is connected to one of the rotating elements of the planetary gear mechanisms, the motor is connected to another rotating element, and the drive wheels are further connected to yet another rotating element. Further, a first clutch mechanism is provided between one rotating element of one of the planetary gear mechanisms and one rotating element of the other planetary gear mechanism, and a second clutch mechanism is provided that connects a predetermined pair of rotating elements in the other rotating elements. The hybrid vehicle is configured such that the first clutch mechanism is engaged so that the Lo mode is set in which a torque transmitted to the drive wheel side, among the torque output from the engine, is relatively large, and the second clutch mechanism is engaged so that the Hi mode is set in which a torque transmitted to the drive wheel side, among the torque output from the engine, is relatively is small. The first clutch mechanism and the second clutch mechanism are each composed of the same meshing clutch as that of JP 2009-222102 A described above.

SUMMARY

As described for the control device of JP 2009-222102 A, when the clutch mechanism is engaged, the differential rotation speed between the input side and the output side of the clutch mechanism is controlled to be equal to or less than a predetermined rotation speed, and then, the actuator is controlled to perform the engagement operation. The differential rotation speed is usually set to a predetermined differential rotation speed that can tolerate a shock at the time of engagement. In the case of the meshing clutch of JP 2009-222102 A or JP 2020-075553 A, the differential rotation speed is set to such a differential rotation speed that the engagement can be completed without interference between the dog teeth of the input side and the dog teeth of the output side or can be completed even if the dog teeth interfere with each other. The design value of the thrust (and pressing force) of the actuator that brings the engagement members close to each other is a value corresponding to the predetermined differential rotation speed. On the other hand, the thrust of the actuator may decrease depending on the temperature of the actuator or the state of the power supply unit that operates the actuator. For example, when the temperature of the actuator is higher than a predetermined temperature, there may be a case where a predetermined thrust (design value) cannot be output. Similarly, when the battery of the power supply unit is low, there may be a case where the stroke speed is low and the predetermined thrust cannot be output. As such, when the thrust of the actuator decreases, there may be a case where the engagement of the clutch mechanism cannot be completed, or the time required for the engagement operation significantly increases. Further, when the traveling mode is switched by engaging the clutch mechanism as in the hybrid vehicle described in JP 2020-075553 A, it may take a long time to complete the switching of the traveling mode (or the switching cannot be completed). Further, when the thrust of the actuator decreases, it is conceivable that a large actuator capable of outputting a predetermined thrust is separately provided, but in such a case, inconveniences may occur such as lowered mountability on the vehicle and increase in cost.

The present disclosure has been made focusing on the above technical issues, and it is an object thereof to provide a control device for an engagement mechanism that can reliably perform engagement operation of the engagement mechanism even when the thrust of the actuator has decreased.

In order to achieve the above object, an aspect of the present disclosure provides a control device for an engagement mechanism. The control device includes: an engagement mechanism having a first engagement element and a second engagement element that are rotatable relative to each other; an actuator that generates a thrust that brings the first engagement element and the second engagement element close to each other when the engagement mechanism is engaged; and a controller for controlling the engagement mechanism. The control device is configured to engage the first engagement element and the second engagement element with the thrust of the actuator when a differential rotation speed that is a difference between a rotation speed of the first engagement element and a rotation speed of the second engagement element is less than a predetermined value set in advance. The controller is configured to, when the first engagement element and the second engagement element are engaged, detect a parameter indicating an operating state including the thrust of the actuator, calculate a target differential rotation speed for engagement of the first engagement element and the second engagement element in accordance with a value of the detected parameter, and control the differential rotation speed to the calculated target differential rotation speed.

In the aspect of the present disclosure, the control device may further include: a sensor that detects the parameter; a target differential rotation speed calculation unit that calculates the target differential rotation speed; and a differential rotation speed control unit that controls the differential rotation speed to the target differential rotation speed. The controller may be configured to, when the first engagement element and the second engagement element are engaged, detect the value of the parameter with the sensor, calculate the target differential rotation speed corresponding to the detected parameter with the target differential rotation speed calculation unit, and control the differential rotation speed to the target differential rotation speed with the differential rotation speed control unit.

In the aspect of the present disclosure, the controller may be configured to control the differential rotation speed to the target differential rotation speed when the value of the parameter indicating the operating state of the actuator deviates from a predetermined value set in advance.

In the aspect of the present disclosure, the target differential rotation speed may be configured to be set to be smaller as a range in which the value of the parameter deviates from the predetermined value is larger.

In the aspect of the present disclosure, the parameter may include at least one parameter, out of a temperature of the actuator, a voltage of a power supply unit that operates the actuator, and a moving speed of the actuator.

In the aspect of the present disclosure, the engagement mechanism may be a meshing clutch in which dog teeth are provided on each of the first engagement element and the second engagement element.

In the aspect of the present disclosure, the control device may further include a first motor serving as a driving force source, wherein a rotating element of one of the first engagement element and the second engagement element may be connected to the first motor and may be configured such that a rotation speed changes with a change in a rotation speed of the first motor, and the first motor may be controlled to control the differential rotation speed to the target differential rotation speed.

In the aspect of the present disclosure, the engagement mechanism may be mounted on a vehicle. The vehicle may have an engine, a first motor, and a second motor as driving force sources. The vehicle may further include a first differential mechanism that performs a differential action with a first rotating element to which the engine is connected, a second rotating element to which the first motor is connected, and a third rotating element that outputs a torque to a drive wheel, and a second differential mechanism that performs a differential action with a fourth rotating element to which the second motor is connected, a fifth rotating element connected to the third rotating element, and a sixth rotating element. The engagement mechanism may include a first engagement mechanism and a second engagement mechanism. The first engagement mechanism may connect the sixth rotating element and the first rotating element or release connection of the sixth rotating element and the first rotating element, and the second engagement mechanism may connect at least two rotating elements, out of the fourth rotating element, the fifth rotating element, and the sixth rotating element, or release connection of the at least two rotating elements. In the vehicle, a plurality of traveling modes may be able to be set. The traveling modes may include a first traveling mode that is set by engagement of the first engagement mechanism, a second traveling mode that is set by engagement of the second engagement mechanism and in which a torque transmitted to the drive wheel is smaller than that in the first traveling mode, and a single mode in which the first engagement mechanism and the second engagement mechanism are disengaged and the vehicle travels only with a drive torque of the second motor. The controller may be configured to engage the first engagement mechanism in a case of shifting from the single mode to the first traveling mode, and engage the second engagement mechanism in a case of shifting from the single mode to the second traveling mode.

According to the aspect of the present disclosure, engagement operation of the engagement mechanism is performed by controlling the differential rotation speed in accordance with the thrust that can be output from the actuator. Specifically, the value of the parameter that affects the thrust of the actuator is detected and the target differential rotation speed of the engagement mechanism is calculated based on the detected value. Then, the differential rotation speed of the engagement mechanism is controlled to the target differential rotation speed. Therefore, even when the thrust of the actuator has decreased due to some factor such as decrease in the temperature of the actuator or the voltage drop of the power supply unit, the target differential rotation speed corresponds to the thrust that can be output by the current actuator. Therefore, it is possible to suppress inconveniences such as incomplete engagement of the engagement mechanism.

Further, according to the aspect of the present disclosure, as described above, the differential rotation speed is controlled in accordance with the thrust that can be output by the actuator. Therefore, it is possible suppress provision of a new mechanism such as an actuator that can generate a larger thrust in order to perform engagement with a predetermined differential rotation speed (design value) set in advance. In other words, it is possible to suppress decrease in mountability on the vehicle and increase in cost due to the mounting.

According to the aspect of the present disclosure, since the engagement mechanism can be reliably engaged, the traveling mode can be smoothly switched in conjunction with the connection of the engagement mechanism.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a table showing engagement and disengagement states of clutch mechanisms and a brake mechanism, operating states of motors, and presence/absence of driving of an engine in each traveling mode;

DETAILED DESCRIPTION OF EMBODIMENTS

Figure 1:
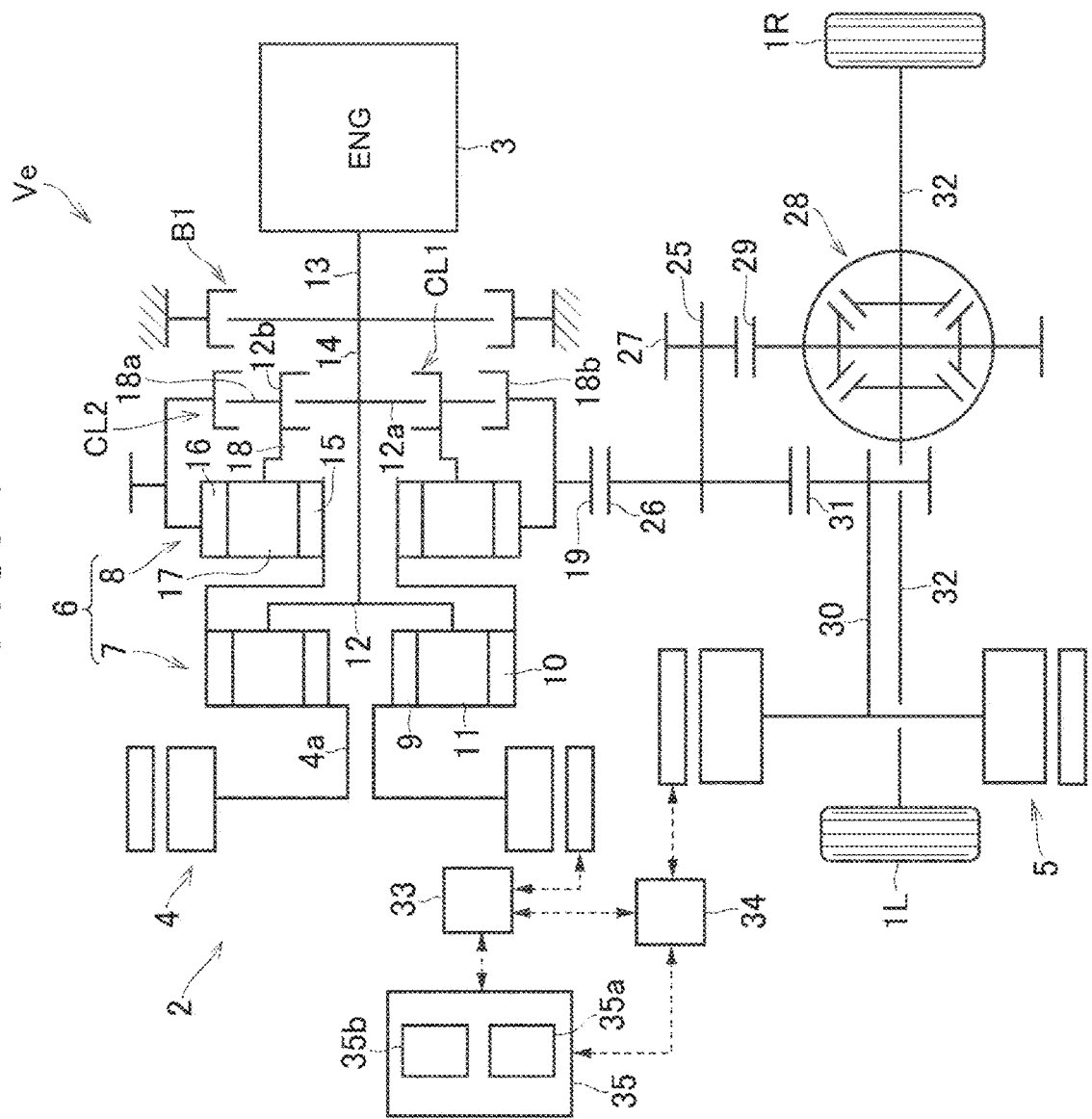
FIG. 1 is a skeleton diagram illustrating an example of a drive device.

The present disclosure will be described based on embodiments shown in the drawings. It should be noted that the embodiments described below are merely examples of cases where the present disclosure is embodied, and do not limit the present disclosure. An example of a hybrid vehicle (hereinafter referred to as a vehicle) Ve in the embodiment of the present disclosure will be described with reference to FIG. 1. FIG. 1 shows a drive device 2 for driving front wheels (drive wheels) 1R and 1L, and the drive device 2 is a so-called two-motor drive device including an engine (ENG) 3 and two motors 4 and 5 as driving force sources. A first motor 4 is composed of a motor having a power generation function (that is, a motor generator: MG1), and the rotation speed of the engine 3 is controlled by the first motor 4. The second motor 5 is driven by electric power generated by the first motor 4, and the torque output by the second motor 5 is added to the driving force for traveling. The second motor 5 can be composed of a motor having a power generation function (that is, a motor generator: MG2).

A power split device 6 corresponding to a differential mechanism according to the embodiment of the present disclosure is connected to the engine 3. The power split device 6 is composed of a split portion 7 that mainly has a function of splitting a torque output from the engine 3 to the first motor 4 side and an output side, and a speed change portion 8 that mainly has a function of changing the torque split ratio.

The split portion 7 only need to have a configuration in which a differential action is performed by three rotating elements, and a planetary gear mechanism can be adopted for the split portion 7. In the example shown in FIG. 1, the split portion 7 is composed of a single pinion-type planetary gear mechanism (first differential mechanism). The split portion 7 shown in FIG. 1 includes a sun gear 9, a ring gear 10 that is an internal gear disposed concentrically with the sun gear 9, a pinion gear 11 disposed between the sun gear 9 and the ring gear 10 and meshing with the sun gear 9 and the ring gear 10, and a carrier 12 that holds the pinion gear 11 so that the pinion gear 11 can rotate and revolve. The carrier 12 corresponds to the "first rotating element" in the embodiment of the present disclosure, the sun gear 9 corresponds to the "second rotating element" in the embodiment of the present disclosure, and the ring gear 10 corresponds to the "third rotating element" in the embodiment of the present disclosure.

The power output from the engine 3 is input to the carrier 12. Specifically, an input shaft 14 of the power split device 6 is connected to an output shaft 13 of the engine 3, and the input shaft 14 is connected to the carrier 12. Instead of the configuration in which the carrier 12 and the input shaft 14 are directly connected, the carrier 12 and the input shaft 14 may be connected via a transmission mechanism (not shown) such as a gear mechanism. Further, a mechanism (not shown) such as a damper mechanism or a torque converter may be arranged between the output shaft 13 and the input shaft 14.

The first motor 4 is connected to the sun gear 9. In the example shown in FIG. 1, the split portion 7 and the first motor 4 are arranged on the same axis as the rotation center axis of the engine 3, and the first motor 4 is disposed on the opposite side of the split portion 7 from the engine 3. Further, the speed change portion 8 is disposed between the split portion 7 and the engine 3 such that the speed change portion 8, the split portion 7 and the engine 3 are coaxially arranged in the direction of the axis.

The speed change portion 8 is composed of a single pinion-type planetary gear mechanism. Similarly to the split portion 7, the speed change portion 8 includes a sun gear 15, a ring gear 16 that is an internal gear disposed concentrically with the sun gear 15, a pinion gear 17 disposed between the sun gear 15 and the ring gear 16 and meshing with the sun gear 15 and the ring gear 16, and a carrier 18 that holds the pinion gear 17 so that the pinion gear 17 can rotate and revolve. Thus, the speed change portion 8 is a differential mechanism (second differential mechanism) that performs a differential action by the three rotating elements including the sun gear 15, the ring gear 16, and the carrier 18. The ring gear 10 of the split portion 7 is connected to the sun gear 15 of the speed change portion 8. Further, the output gear 19 is connected to the ring gear 16 of the speed change portion 8. The ring gear 16 corresponds to the "fourth rotating element" in the embodiment of the present disclosure, the sun gear 15 corresponds to the "fifth rotating element" in the embodiment of the present disclosure, and the carrier 18 corresponds to the "sixth rotating element" in the embodiment of the present disclosure.

A first clutch mechanism (first engagement mechanism) CL1 is provided so that the split portion 7 and the speed change portion 8 constitute a composite planetary gear mechanism. The first clutch mechanism CL1 is configured to selectively connect the carrier 18 of the speed change portion 8 to the carrier 12 and the input shaft 14 of the split portion 7. Specifically, the first clutch mechanism CL1 has rotating members 12a and 12b that transmit torque by being engaged with each other and shut off torque by being disengaged from each other. One rotating member 12a is connected to the input shaft 14, and the other rotating member 12b is connected to the carrier 18. One of the rotating members 12a and 12b corresponds to the "first engagement element" in the embodiment of the present disclosure, and the other corresponds to the "second engagement element" in the embodiment of the present disclosure. The first clutch mechanism CL1 may be a friction-type clutch mechanism such as a wet multi-plate clutch, or may be a meshing-type clutch mechanism such as a dog clutch. Alternatively, the first clutch mechanism CL1 may be a so-called normal stay-type clutch mechanism that is configured such that the connected state and the disconnected state are switched by input of the control signal, and when the control signal is not input, the state immediately before the input of the control signal is stopped (connected state or disconnected state) is maintained. By engaging the first clutch mechanism CL1, the carrier 12 of the split portion 7 and the carrier 18 of the speed change portion 8 are connected to constitute an input element, the sun gear 9 of the split portion 7 constitutes a reaction force element, and the ring gear 16 of the speed change portion 8 constitutes an output element. Thus, the composite planetary gear mechanism is provided. That is, the composite planetary gear mechanism is configured so that the input shaft 14 and the output shaft 4a of the first motor 4 and a driven gear 26 described later can rotate differentially.

Further, a second clutch mechanism (second engagement mechanism) CL2 is provided for integrating the entire speed change portion 8. The second clutch mechanism CL2 is used for connecting at least any two rotating elements in the speed change portion 8, e.g., connecting the carrier 18 and the ring gear 16 or the sun gear 15 or connecting the sun gear 15 and the ring gear 16. The second clutch mechanism CL2 can be composed of a clutch mechanism of friction type, meshing type, or normal stay type. In the example shown in FIG. 1, the second clutch mechanism CL2 is configured to connect the carrier 18 and the ring gear 16 in the speed change portion 8. Specifically, the second clutch mechanism CL2 has rotating members 18a and 18b that transmit torque by being engaged with each other and shut off torque by being disengaged from each other. One rotating member 18a is connected to the carrier 18, and the other rotating member 18b is connected to the ring gear 16. One of the rotating members 18a and 18b corresponds to the "first engagement element" in the embodiment of the present disclosure, and the other corresponds to the "second engagement element" in the embodiment of the present disclosure.

Figure 2:
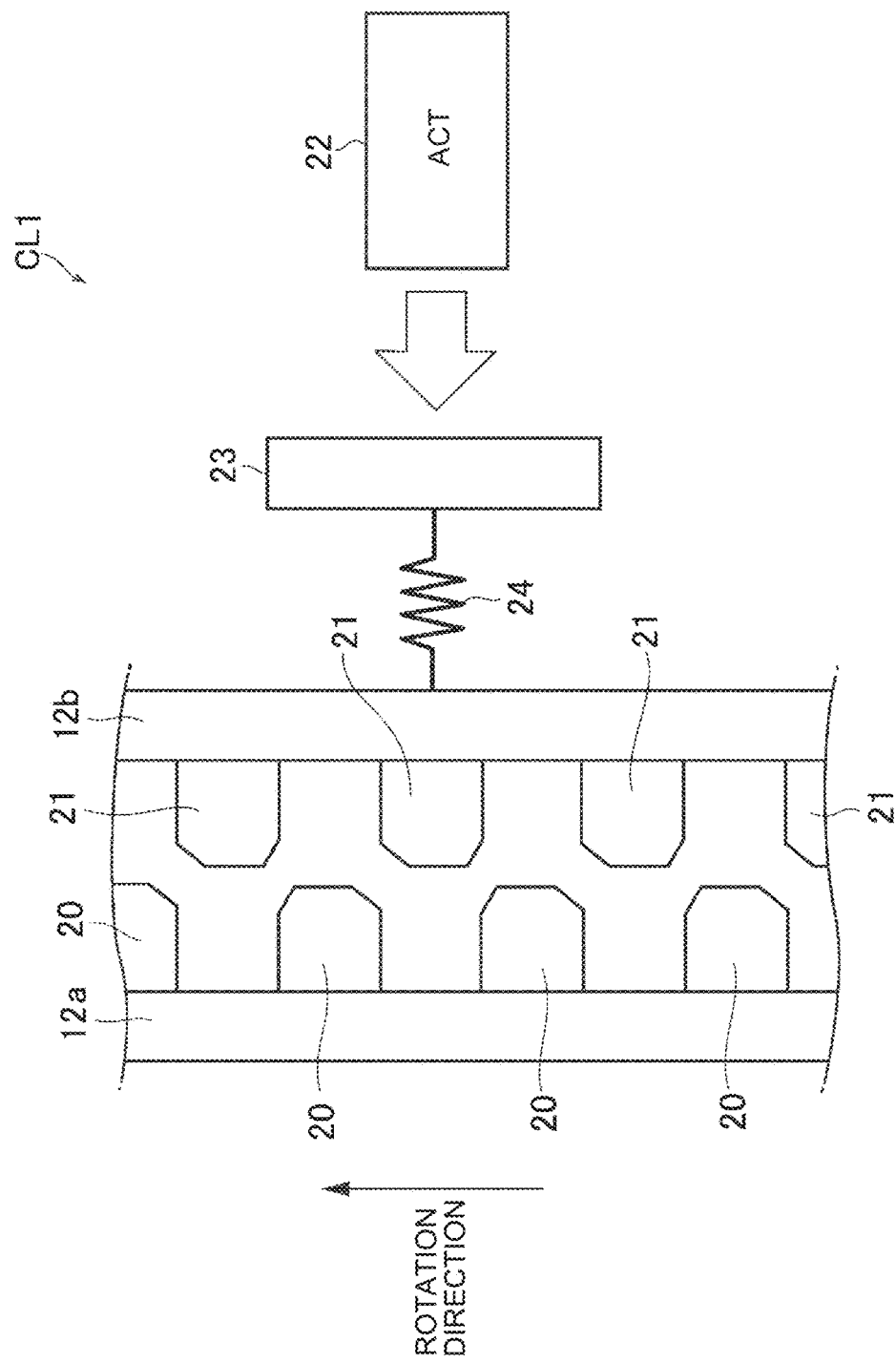
FIG. 2 is a schematic diagram illustrating a configuration example of a clutch mechanism.

FIG. 2 is a schematic view illustrating an example of the configurations of the first clutch mechanism CL1 and the second clutch mechanism CL2. Since both the first clutch mechanism CL1 and the second clutch mechanism CL2 can be configured in the same manner, the first clutch mechanism CL1 will be illustrated in the description of FIG. 2. The first clutch mechanism CL1 shown in FIG. 2 has the two rotating members 12a and 12b that face each other and that can rotate relative to each other, and the rotating members 12a and 12b are provided with dog teeth 20 and 21, respectively. An actuator (ACT) 22 that generates a pressing force and a thrust corresponding to hydraulic pressure, electromagnetic force, or the like is connected to the one rotating member 12b. In the example shown in FIG. 2, a pressure receiving member 23 is provided to receive the pressing force and the thrust of the actuator 22. The pressure receiving member 23 is provided on the back surface of the one rotating members 12b (the surface opposite to the surface provided with the dog teeth 20) so as to rotate integrally with the one rotating member 12b. An elastic member 24 such as a spring is provided between the pressure receiving member 23 and the one rotating members 12b.

Further, in the first clutch mechanism CL1 shown in FIG. 2, a tip end of each dog tooth 20, 21, which faces a mating tooth 21(20), is chamfered to have a tapered shape, such that, even when there is a difference in rotation speed between the one rotating member 12a and the other rotating member 12b, the first clutch mechanism CL1 can be switched from the disengaged state to the engaged state or a phenomenon is suppressed that the phases of the one rotating member 12a and the other rotating member 12b substantially match with each other and the tip ends of the dog teeth 20, 21 contact each other to fail to be engaged. Specifically, when each of the rotating members 12a and 12b is assumed to be rotating in the direction indicated by an arrow in FIG. 2, the dog teeth 20 of the one rotating member are each chamfered such that chamfering on the leading side in the rotating direction is larger than that on the trailing side, and the dog teeth 21 of the other rotating member are each chamfered such that chamfering on the leading side in the rotation direction is smaller than that on the trailing side.

When the clutch mechanism shown in FIG. 2 is adopted for the first clutch mechanism CL1, for example, the input shaft 14 or the carrier 12 or a member that rotates integrally therewith may be adopted as the other rotating member 12b, and the carrier 18 or a member that rotates integrally therewith may be adopted as the one rotating member 12a. When the clutch mechanism is adopted for the second clutch mechanism CL2, the carrier 18 or a member that rotates integrally therewith may be adopted as the one rotating member 12a, and the ring gear 16 or a member that rotates integrally therewith may be adopted as the other rotating member 12b.

In addition, for example, a configuration may be adopted that includes a sleeve that operates along a cam groove of a drum to switch the first clutch mechanism CL1 between the engaged state and the disengaged state, a sleeve that operates along the cam groove to switch the second clutch mechanism CL2 between the engaged state and the disengaged state, and one actuator for controlling the rotation angle of the drum.

A counter shaft 25 is disposed in parallel with the rotation center axis of the engine 3, the split portion 7, or the speed change portion 8. A driven gear 26 that meshes with the output gear 19 is attached to the counter shaft 25. Further, a drive gear 27 is attached to the counter shaft 25, and the drive gear 27 meshes with a ring gear 29 of a differential gear unit 28 that is a final reduction gear. Further, the driven gear 26 is meshed with a drive gear 31 attached to a rotor shaft 30 of the second motor 5. Thus, power or torque output from the second motor 5 is added to the power or torque output from the output gear 19 at the driven gear 26. The power or torque combined in this way is output from the differential gear unit 28 to right and left drive shafts 32 so that the power or torque is transmitted to front wheels 1R and 1L.

The drive device 2 includes a friction-type or meshing-type brake mechanism (third engagement mechanism) B1 for stopping the rotation of the engine 3 when the first motor 4 is used as a driving force source for traveling. That is, the brake mechanism B1 is provided between a predetermined fixed portion and the output shaft 13 or the input shaft 14, and is engaged to fix the output shaft 13 or the input shaft 14 so as to allow the carrier 12 of the split portion 7 or the carrier 18 of the speed change portion 8 to function as a reaction force element and allow the sun gear 9 of the split portion 7 to function as an input element. The brake mechanism B1 is not limited to a configuration in which the output shaft 13 or the input shaft 14 is completely fixed, as long as it can generate a reaction torque when the first motor 4 outputs a drive torque. The brake mechanism B1 only need to apply a required reaction torque to the output shaft 13 or the input shaft 14. Alternatively, a one-way clutch may be provided as the brake mechanism B1 that prohibits the output shaft 13 and the input shaft 14 from rotating in a direction opposite to the direction in which the engine 3 rotates when the engine 3 is driven.

A first power control device 33 equipped with an inverter, a converter, etc. is connected to the first motor 4, and a second power control device 34 equipped with an inverter, a converter, etc. is connected to the second motor 5, and each of these power control devices 33 and 34 is electrically connected to a power supply unit 35. The power supply unit 35 includes a main battery (driving battery) 35a composed of a lithium ion battery, a capacitor, an all-solid-state battery, and the like, and an auxiliary battery 35b for supplying electric power to the auxiliary equipment such as the actuator 22 described above. Further, the first power control device 33 and the second power control device 34 are configured to be able to supply electric power to each other. Specifically, when the first motor 4 functions as a generator as outputting the reaction torque, the electric power generated by the first motor 4 can be supplied to the second motor 5.

As described above, the main battery 35a is composed of the lithium ion battery, the capacitor, the all-solid-state battery, and the like. Since these power storage devices have different characteristics, the vehicle Ve is not limited to a configuration in which the main battery is composed of a single type of device, and may be configured by combining a plurality of power storage devices in consideration of the characteristics of each device.

Figure 3:
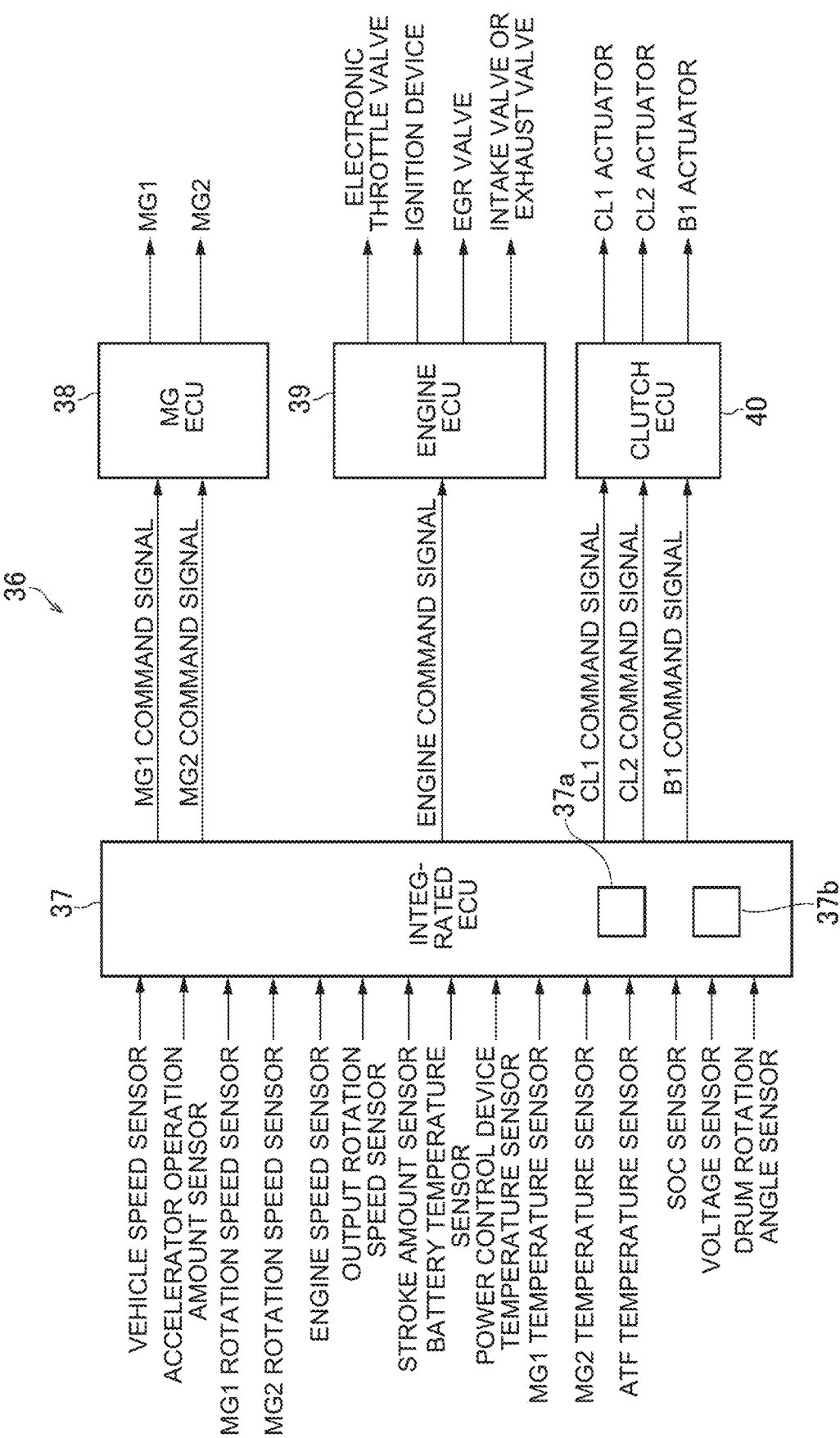
FIG. 3 is a block diagram illustrating a configuration of an electronic control unit (ECU)

An electronic control unit (ECU) 36 for controlling the inverter and the converter of each of the power control devices 33 and 34, the engine 3, the clutch mechanisms CL1 and CL2, and the brake mechanism B1 is provided. The ECU 36 corresponds to the "controller" in the embodiment of the present disclosure, and is mainly composed of a microcomputer. FIG. 3 is a block diagram illustrating an example of the configuration of the ECU 36. In the example shown in FIG. 3, the ECU 36 is composed of an integrated ECU 37, a motor-generator (MG)-ECU 38, an engine ECU 39, and a clutch ECU 40.

The integrated ECU 37 is configured to perform calculations based on data input from various sensors mounted on the vehicle Ve and maps, calculation formulas, etc., stored in advance and output the calculation results to the MG-ECU38, the engine ECU39, and the clutch ECU 40 as command signals. FIG. 3 shows an example of data from various sensors input to the integrated ECU 37. The data input to the integrated ECU 37 includes a vehicle speed, an accelerator operation amount, a rotation speed of the first motor (MG1) 4, a rotation speed of the second motor (MG2) 5, a rotation speed of the output shaft 13 of the engine 3 (engine speed), output rotation speed that is a rotation speed of the counter shaft 25 of the speed change portion 8, a stroke amount of a piston (actuator) provided in each of the clutch mechanisms CL1, CL2, and the brake mechanism B1, a temperature and a voltage of the power supply unit 35, temperatures of the power control devices 33 and 34, a temperature of the first motor 4, a temperature of the second motor 5, a temperature of oil (automatic transmission fluid (ATF)) that lubricates the split portion 7 and the speed change portion 8, a state of charge (SOC) of each of the batteries 35a and 35b, a rotation angle of the drum, etc. Further, as shown in FIG. 3, the integrated ECU 37 includes a target differential rotation speed calculation unit 37a for calculating a target differential rotation speed of each of the clutch mechanisms CL1 and CL2, and a differential rotation speed control unit 37b for controlling the target differential rotation speed.

Then, the operating state (output torque and rotation speed) of the first motor 4 and the operating state (output torque and rotation speed) of the second motor 5 are obtained based on the data input to the integrated ECU 37, and the obtained data is output to the MG-ECU 38 as command signals. Similarly, the operating state (output torque and speed) of the engine 3 is obtained based on the data input to the integrated ECU 37, and the obtained data is output to the engine ECU 39 as a command signal. Similarly, the transmission torque capacities (including "0") of the clutch mechanisms CL1 and CL2 and the brake mechanism B1 are obtained based on the data input to the integrated ECU 37, and the obtained data is output to the clutch ECU 40 as command signals.

The MG-ECU 38 obtains a current value with which each of the motors 4 and 5 is energized based on the data input from the integrated ECU 37 as described above, and outputs a command signal to each of the motors 4 and 5. Since the motors 4 and 5 are alternating current (AC) motors, the above command signal includes the frequency of the current to be generated by the inverter, the voltage value to be boosted by the converter, and the like.

The engine ECU 39 obtains, based on the data input from the integrated ECU 37 as described above, command values such as the current value and the number of pulses for determining the opening degree of the electronic throttle valve, the current value and the number of pulses for igniting fuel in the ignition device, the current value and the number of pulses for determining the opening degree of the exhaust gas recirculation (EGR) valve, and the current value and the number of pulses for determining the opening degrees of the intake valve and exhaust valve, and outputs command signals to the valves. That is, the command signals for controlling the output (power) of the engine 3 and the output torque of the engine 3 or the engine speed are output from the engine ECU 39.

Based on the data input from the integrated ECU 37 as described above, the clutch ECU 40 obtains command values for energizing the actuators that determine the engagement pressures of the clutch mechanisms CL1 and CL2 and the brake mechanism B1 and outputs command signals to the actuators.

In the drive device 2, a hybrid vehicle (HV) traveling mode in which the vehicle travels with a drive torque output from the engine 3 and an electric vehicle (EV) traveling mode in which the vehicle travels with a drive torque output from the first motor 4 and the second motor 5 and without a drive torque output from the engine 3 can be set. Further, in the HV traveling mode, an HV-Lo mode, an HV-Hi mode, and a direct coupling mode (fixed gear mode) can be set when the first motor 4 is rotated at a low rotation speed (including the rotation speed of "0"). In the HV-Lo mode, the rotation speed of the engine 3 (or the input shaft 14) is higher than the rotation speed of the ring gear 16 of the speed change portion 8. In the HV-Hi mode, the rotation speed of the engine 3 (or the input shaft 14) is lower than the rotation speed of the ring gear 16 of the speed change portion 8. In the direct coupling mode, the rotation speed of the ring gear 16 of the speed change portion 8 is the same as the rotation speed of the engine 3 (or the input shaft 14). The torque amplification factor is larger in the HV-Lo mode than in the HV-Hi mode.

Furthermore, in the EV traveling mode, a dual mode and a single mode (separation mode) can be set. In the dual mode, the drive torque is output from the first motor 4 and the second motor 5. In the single mode, the drive torque is output only from the second motor 5 without outputting the drive torque from the first motor 4. Further, in the dual mode, an EV-Lo mode and an EV-Hi mode can be set. In the EV-Lo mode, the amplification factor of the torque output from the first motor 4 is relatively large. In the EV-Hi mode, the amplification factor of the torque output from the first motor 4 is smaller than that in the EV-Lo mode. In the single mode, the vehicle can travel as outputting the drive torque from only the second motor 5 with the first clutch mechanism CL1 being engaged, the vehicle can travel as outputting the drive torque from only the second motor 5 with the second clutch mechanism CL2 being engaged, or the vehicle can travel as outputting the drive torque from only the second motor 5 with the clutch mechanisms CL1, CL2 being disengaged.

Each of the traveling modes is set by controlling the first clutch mechanism CL1, the second clutch mechanism CL2, the brake mechanism B1, the engine 3, and the motors 4 and 5. FIG. 4 shows an example of the traveling modes, the engaged and disengaged states of the first clutch mechanism CL1, the second clutch mechanism CL2, and the brake mechanism B1, the operating states of the first motor 4 and the second motor 5, and the presence or absence of the output of the drive torque from the engine 3, in each traveling mode. In FIG. 4, symbol "•" indicates the engaged state, symbol "-" indicates the disengaged state, symbol "G" represents that the motor operates mainly as a generator, symbol "M" represents that the motor operates mainly as a motor, a blank represents that the motor is not functioning as a motor and a generator or the first motor 4 and the second motor 5 are not involved in driving, "ON" indicates a state in which the drive torque is output from the engine 3, and "OFF" indicates a state in which the drive torque is not output from the engine 3. The traveling mode set by engaging the first clutch mechanism CL1 corresponds to a "first traveling mode" in the embodiment of the present disclosure, and the traveling mode set by engaging the second clutch mechanism CL2 corresponds to a "second traveling mode" in the embodiment of the present disclosure.

FIGS. 5 to 10 show collinear diagrams illustrating the rotation speed of each rotating element of the power split device 6 and the direction of torque of each of the engine 3 and the motors 4 and 5 when each traveling mode is set. The collinear diagram is a diagram in which straight lines indicating the rotating elements in the power split device 6 are drawn parallel to each other at intervals corresponding to the gear ratio, and the distance from the baseline orthogonal to these straight lines shows the rotation speed of each rotating element. The arrows superimposed on the straight lines indicating the rotating elements represent the directions of the torque and the lengths of the arrows represent magnitudes of the torque.

Figure 5:
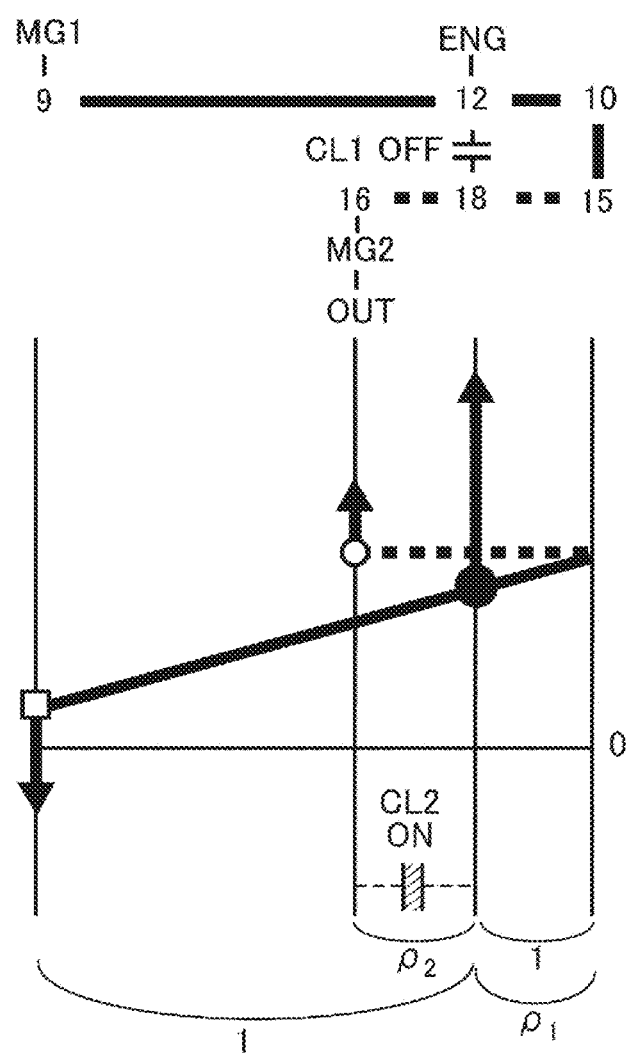
FIG. 5 is a collinear diagram illustrating an operating state in an HV-Hi mode.
Figure 6:
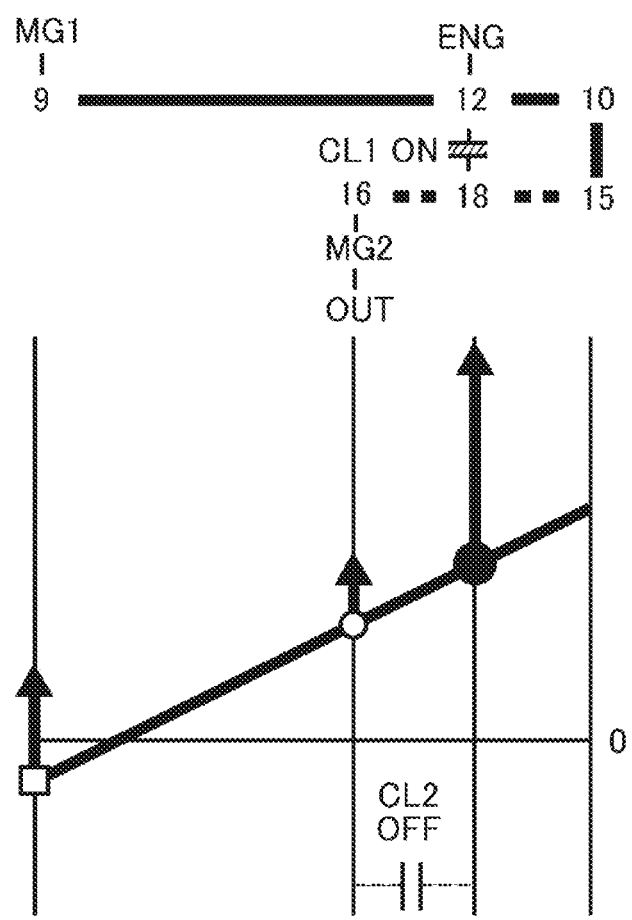
FIG. 6 is a collinear diagram illustrating the operating state in an HV-Lo mode.

As shown in FIG. 5, in the HV-Hi mode, the drive torque is output from the engine 3, the second clutch mechanism CL2 is engaged, and the reaction torque is output from the first motor 4. As shown in FIG. 5, in the HV-Lo mode, the drive torque is output from the engine 3, the first clutch mechanism CL1 is engaged, and the reaction torque is output from the first motor 4. When the HV-Hi mode or HV-Lo mode is set, the rotation speed of the first motor 4 is controlled such that the efficiency of the drive device 2 as a whole in consideration of the fuel consumption of the engine 3 and the drive efficiency of the first motor 4 (a value obtained by dividing the amount of energy consumption by the amount of energy of the front wheels 1R and 1L) is maximized. The rotation speed of the first motor 4 can be continuously changed steplessly, and the engine speed is determined based on the rotation speed of the first motor 4 and the vehicle speed. Thus, the power split device 6 can function as a continuously variable transmission.

When the first motor 4 functions as a generator as outputting the reaction torque therefrom as described above, part of the power of the engine 3 is converted into electric energy by the first motor 4. Then, power obtained by removing the power component converted into electric energy by the first motor 4 from the power of the engine 3 is transmitted to the ring gear 16 of the speed change portion 8. The reaction torque output from the first motor 4 is determined in accordance with the split ratio of the torque transmitted from the engine 3 to the first motor 4 side via the power split device 6. The ratio of the torque transmitted from the engine 3 to the first motor 4 side via the power split device 6 to the torque transmitted to the ring gear 16 side, that is, the torque split ratio in the power split device 6 differs between the HV-Lo mode and the HV-Hi mode.

Specifically, when the torque transmitted to the first motor 4 side is "1", the torque split ratio, which is the ratio of the torque transmitted to the ring gear 16 side, is "$1/(\rho1\times\rho2)$" in the HV-Lo mode and "$1/\rho1$" in the HV-Hi mode. That is, the ratio of the torque transmitted to the ring gear 16 out of the torque output from the engine 3 is "$1/(1-(\rho1\times\rho2))$" in the HV-Lo mode, and "$1/(\rho1+1)$" in the HV-Hi mode. Here, "$\rho1$" is a gear ratio of the split portion 7 (ratio between the number of teeth of the ring gear 10 and the number of teeth of the sun gear 9), and "$\rho2$" is a gear ratio of the speed change portion 8 (ratio between the number of teeth of the ring gear 16 and the sun gear 15). Note that $\rho1$ and $\rho2$ are values smaller than "1". Therefore, when the HV-Lo mode is set, the proportion of the torque transmitted to the ring gear 16 is larger than when the HV-Hi mode is set.

When the output of the engine 3 is increased to increase the rotation speed of the engine 3, the torque corresponding to the power obtained by subtracting the power required to increase the rotation speed of the engine 3 from the output of the engine 3 serves as the torque output from the engine 3. Then, the electric power generated by the first motor 4 is supplied to the second motor 5. In that case, the electric power charged in the main battery 35a is also supplied to the second motor 5 as needed.

Figure 7:
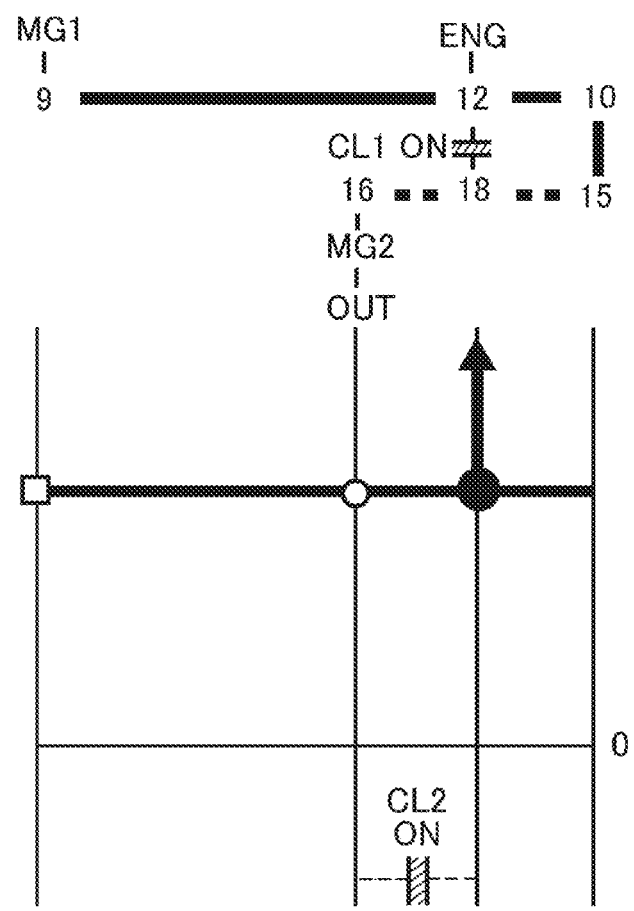
FIG. 7 is a collinear diagram illustrating the operating state in a direct coupling mode.

In the direct coupling mode, each of the clutch mechanisms CL1 and CL2 is engaged so that each rotating element in the power split device 6 rotates at the same rotation speed as shown in FIG. 7. That is, all the power of the engine 3 is output from the power split device 6. In other words, part of the power of the engine 3 is not converted into electric energy by the first motor 4 and the second motor 5. Thus, there is no loss due to Joule loss or the like that occurs when the power is converted into electrical energy. Therefore, the power transmission efficiency is improved.

Figure 8:
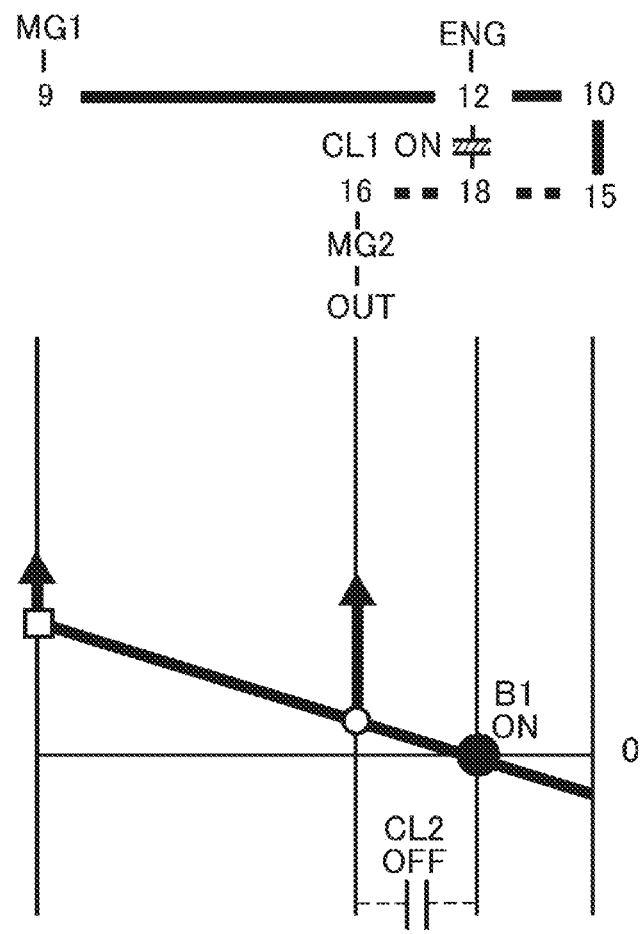
FIG. 8 is a collinear diagram illustrating the operating state in an EV-Lo mode.
Figure 9:
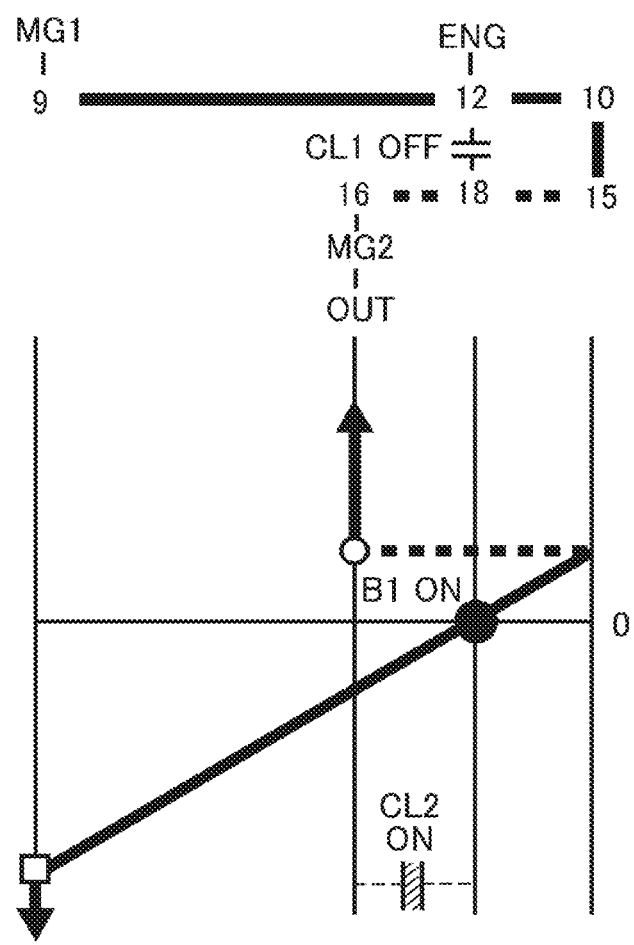
FIG. 9 is a collinear diagram illustrating the operating state in an EV-Hi mode.

Further, as shown in FIGS. 8 and 9, in the EV-Lo mode and the EV-Hi mode, the brake mechanism B1 is engaged and the drive torque is output from the motors 4 and 5 to drive the vehicle. Specifically, as shown in FIG. 8, in the EV-Lo mode, the brake mechanism B1 and the first clutch mechanism CL1 are engaged, and the drive torque is output from the motors 4 and 5 to drive the vehicle. That is, the brake mechanism B1 applies a reaction torque for limiting the rotation of the output shaft 13 or the carrier 12. In that case, the rotation direction of the first motor 4 is the positive direction, and the direction of the output torque is the direction of increasing the rotation speed. Specifically, as shown in FIG. 9, in the EV-Hi mode, the brake mechanism B1 and the second clutch mechanism CL2 are engaged, and the drive torque is output from the motors 4 and 5 to drive the vehicle. That is, the brake mechanism B1 applies a reaction torque for limiting the rotation of the output shaft 13 or the carrier 12. In that case, the rotation direction of the first motor 4 is an opposite direction (negative direction) to the rotation direction (positive direction) of the engine 3, and the direction of the output torque is the direction of increasing the rotation speed.

Figure 10:
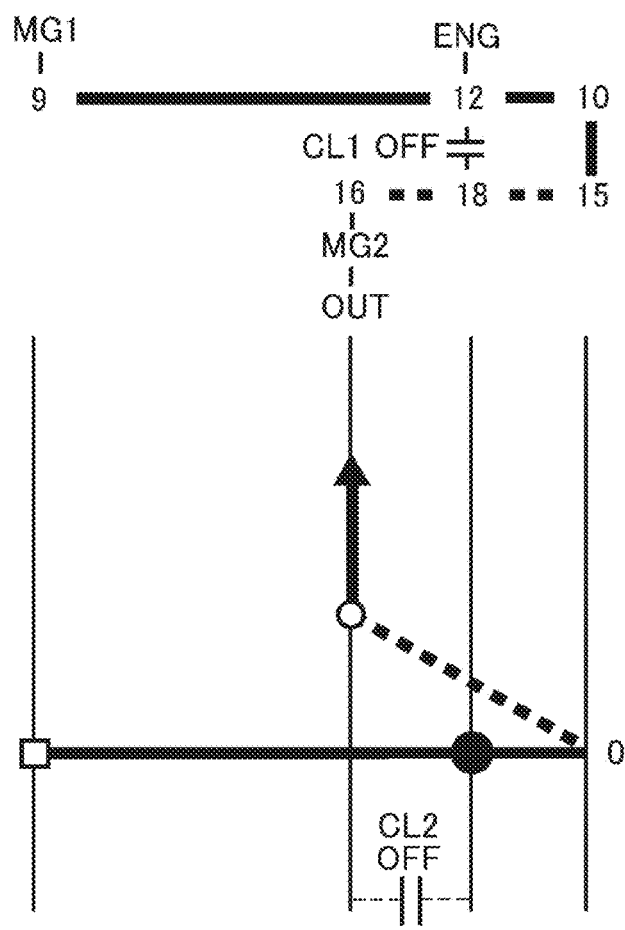
FIG. 10 is a collinear diagram illustrating the operating state in a single mode.

Further, the rotation speed ratio between the rotation speed of the ring gear 16 of the speed change portion 8 and the rotation speed of the first motor 4 is larger in the EV-Lo mode than in the EV-Hi mode. That is, when the vehicle is traveling at the same vehicle speed, the rotation speed of the first motor 4 is higher when the EV-Lo mode is set than when the EV-Hi mode is set. That is, the EV-Lo mode has a larger reduction ratio than the EV-Hi mode. Therefore, a large driving force can be obtained by setting the EV-Lo mode. The rotation speed of the ring gear 16 is the rotation speed of the output member (or the output side), and in the gear train of FIG. 1, the gear ratio of each member from the ring gear 16 to the drive wheels is set to 1 for convenience. Then, in the single mode, as shown in FIG. 10, the drive torque is output only from the second motor 5 and the clutch mechanisms CL1 and CL2 are disengaged, so that each rotating element of the power split device 6 is in a stopped state. Thus, it is possible to reduce the power loss caused by accompanying rotation of the engine 3 and the first motor 4.

Each of the traveling modes is determined based on the state of charge (SOC) of the main battery 35$a$, the vehicle speed, the required driving force, and the like. In the embodiment of the present disclosure, a charge sustain (CS) mode or a charge depleting (CD) mode is selected in accordance with the state of charge of the main battery 35$a$. In the CS mode, each traveling mode is set so as to maintain the state of charge of the main battery 35$a$. In the CD mode, electric power charged in the power storage device is actively used. Specifically, the CS mode is selected when the state of charge of the main battery 35$a$ is low, and the CD mode is selected when the state of charge of the main battery 35$a$ is relatively high.

Figure 11:
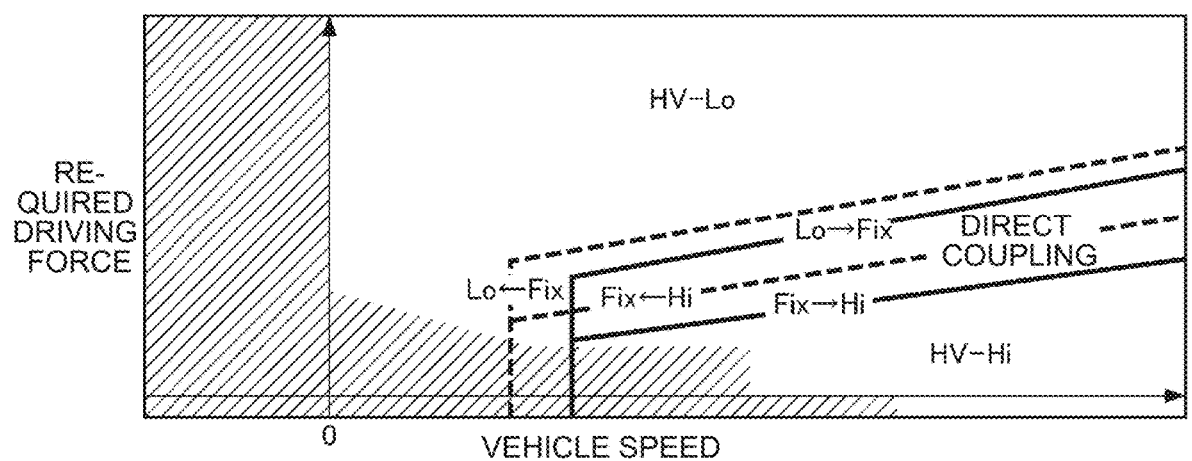
FIG. 11 is a diagram showing an example of a map for determining each traveling mode when a charge sustain (CS) mode is selected.

FIG. 11 shows an example of a map for determining each traveling mode when the CS mode is selected. The horizontal axis of the map indicates the vehicle speed, and the vertical axis indicates the required driving force. The vehicle speed can be obtained from the data detected by the vehicle speed sensor, and the required driving force can be obtained from the data detected by the accelerator operation amount sensor.

In the example shown in FIG. 11, the single mode is set when the vehicle is traveling forward and the required driving force is relatively small (including a deceleration request). The region for which the single mode is set is determined based on the characteristics of the second motor 5. The region for which the single mode is set is hatched.

Further, when the vehicle is traveling forward and the required driving force is relatively large, the HV traveling mode is set. In the HV traveling mode, the driving force can be output over a range from the low vehicle speed region to the high vehicle speed region. Therefore, when the state of charge of the main battery 35$a$ becomes close to a lower limit value, the HV traveling mode may be set even in the region where the single mode should be set.

Further, when the HV traveling mode is set, one of the HV-Lo mode, the HV-Hi mode, or the direct coupling mode is selected in accordance with the vehicle speed and the required driving force. Specifically, the HV-Lo mode is selected when the vehicle speed is relatively low or the required driving force is relatively large, the HV-Hi mode is selected when the vehicle speed is relatively high and the required driving force is relatively small, and the direct coupling mode is selected when the operating state of the vehicle Ve corresponds to an operating point (value based on the vehicle speed and the required driving force) between the regions for which the HV-Lo mode and the HV-Hi mode are set.

Further, the HV-Lo mode, the direct coupling mode, and the HV-Hi mode are switched when the operating point crosses each line shown in FIG. 11. Specifically, when the operating point changes as crossing the line "Lo←Fix" in FIG. 11 from the right side to the left side in FIG. 11, or when the operating point changes as crossing the line from the lower side to the upper side, the traveling mode is switched from the direct coupling mode to the HV-Lo mode. When the operating point changes as crossing the line "Lo→Fix" from the left side to the right side, or when the operating point changes as crossing the line from the upper side to the lower side, the traveling mode is switched from the HV-Lo mode to the direct coupling mode. Similarly, when the operating point changes as crossing the line "Fix←Hi" from the right side to the left side in FIG. 11, or when the operating point changes as crossing the line from the lower side to the upper side, the traveling mode is switched from the HV-Hi mode to the direct coupling mode. When the operating point changes as crossing the line "Fix→Hi" from the left side to the right side, or when the operating point changes as crossing the line from the upper side to the lower side, the traveling mode is switched from the direct coupling mode to the HV-Hi mode.

Figure 12:
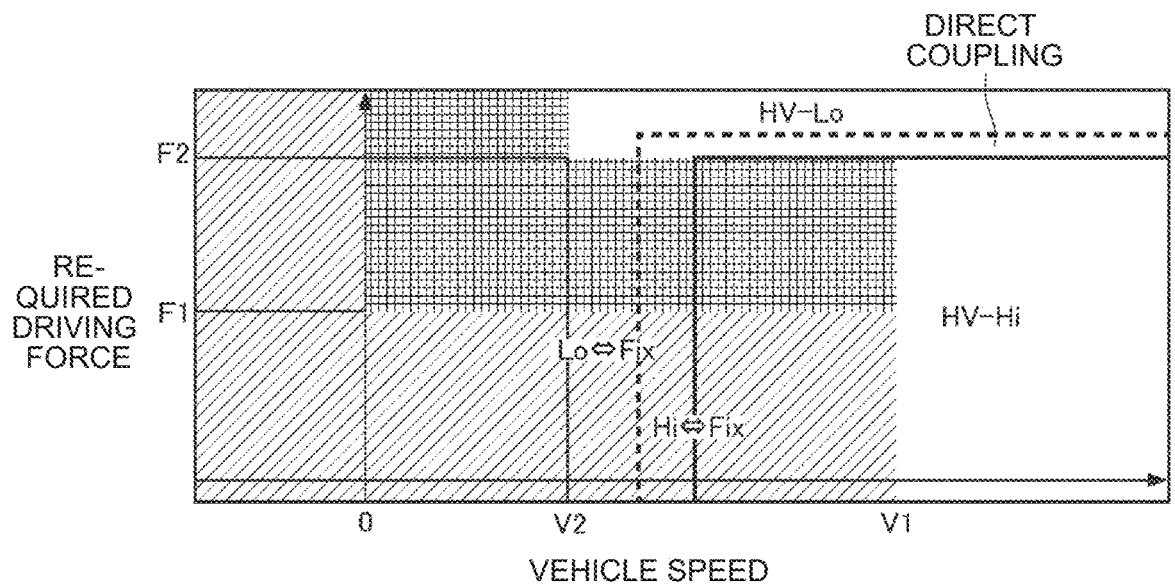
FIG. 12 is a diagram showing an example of a map for determining each traveling mode when a charge depleting (CD) mode is selected.

FIG. 12 shows an example of a map for determining each traveling mode when the CD mode is selected. The horizontal axis of the map indicates the vehicle speed, and the vertical axis indicates the required driving force. The vehicle speed can be obtained from the data detected by the vehicle speed sensor, and the required driving force can be obtained from the data detected by the accelerator operation amount sensor.

In the example shown in FIG. 12, the single mode is set when the vehicle is traveling forward and the required driving force is smaller than a first driving force F1 (including a deceleration request). The region for which the single mode is set is determined based on the characteristics and the like of the second motor 5. The region for which the single mode is set is hatched.

Further, when the vehicle is traveling forward and the required driving force is larger than the first driving force F1, the dual mode is set. Further, when the vehicle speed is higher than a first vehicle speed V1 or when the vehicle speed is higher than a second vehicle speed V2 and the required driving force is larger than a second driving force F2, the HV traveling mode is set. In the HV traveling mode, the driving force can be output over a range from the low vehicle speed region to the high vehicle speed region. Therefore, when the state of charge of the main battery 35$a$ becomes close to a lower limit value, the HV traveling mode may be set even in the region where the single mode or the dual mode should be set.

Further, when the HV traveling mode is set, one of the HV-Lo mode, the HV-Hi mode, or the direct coupling mode is selected in accordance with the vehicle speed and the required driving force. Specifically, the HV-Lo mode is selected when the vehicle speed is relatively low or the required driving force is relatively large, the HV-Hi mode is selected when the vehicle speed is relatively high and the required driving force is relatively small, and the direct coupling mode is selected when the traveling state of the vehicle Ve corresponds to an operating point (value based on the vehicle speed and the required driving force) between the regions for which the HV-Lo mode and the HV-Hi mode are set.

Further, the traveling mode is switched to the HV-Lo mode, the direct coupling mode, and the HV-Hi mode when the operating point changes as crossing each line shown in FIG. 12. Specifically, when the operating point changes as crossing the line "Lo↔Fix" in FIG. 12, the traveling mode can be switched between the direct coupling mode and the HV-Lo mode. Specifically, when the operating point changes as crossing the line "Fix↔Hi" in FIG. 12, the traveling mode can be switched between HV-Hi mode and the direct coupling mode.

The regions for which the traveling modes are set and the lines for switching the mode under the conditions where the HV traveling mode is set shown in FIGS. 11 and 12 may vary depending on the temperature of each member constituting the drive device 2, the temperature of the main battery 35a or the power control devices 33, 34, or the state of charge of the main battery 35a.

As described above, in the vehicle Ve configured in this way, the plurality of traveling modes can be set by switching the engaging state of the engagement mechanism such as the clutch mechanism. The traveling modes are set in accordance with the accelerator operation amount based on the driver's accelerator operation and the required driving force. Thus, for example, when the required driving force increases due to the accelerator operation during traveling in the single mode in which the vehicle travels with the drive torque of only the second motor 5, the traveling mode is shifted to the dual mode or the HV mode, and when the travel mode is shifted, the first clutch mechanism CL1 or the second clutch mechanism CL2 is engaged. Specifically, the drive-side member and the driven-side member of the clutch mechanism CL1 (CL2) to be engaged are connected so as to be able to transmit torque, and in that case, the differential rotation speed that is the difference in rotation speed between the drive-side member and the driven-side member is controlled to such a rotation speed that the clutch mechanism CL1 (CL2) can be engaged. That is, the differential rotation speed is controlled to the rotation speed at which the shock at the time of engagement can be tolerated (that is, the synchronous rotation speed).

Further, in order to engage the clutch mechanism CL1 (CL2) in the disengaged state, the actuator 22 brings the drive-side member and the driven-side member close to each other when the differential rotation speed of the clutch mechanism CL1 (CL2) becomes a predetermined differential rotation speed. That is, the drive-side member is moved to the driven-side member side by the actuator 22, and the clutch mechanism CL1 (CL2) is engaged with the thrust of the actuator 22. On the other hand, the thrust of the actuator 22 may decrease when the temperature of the actuator 22 is higher than a predetermined temperature. The predetermined temperature is a temperature at which a thrust for engagement control can be generated when the differential rotation speed of the clutch mechanism CL1 (CL2) is set to a predetermined differential rotation speed. The predetermined temperature is based on, for example, the temperature of oil (ATF). Since the actuator 22 is incorporated in the drive device 2, the temperature of the actuator 22 can be indirectly detected by detecting the temperature of the oil. In addition to the oil temperature, the temperature of each of the motors 4 and 5 and the temperature of the actuator 22 itself may be used as a reference. Similarly, the thrust of the actuator 22 also decreases when the voltage (operating voltage) of the auxiliary battery 35b decreases. Further, the thrust is also decreases when the moving speed (stroke) of the actuator 22 decreases. That is, when the value of at least one of the parameters indicating the operating state of the actuator 22 deviates from a predetermined value, the thrust of the actuator 22 decreases. Thus, when the temperature or the operating voltage of the actuator 22 deviates from the predetermined value (or a predetermined range) as described above, there may be a case where the predetermined thrust cannot be generated. That is, there may be a case where the thrust of the actuator 22, which allows the clutch mechanism CL1 (CL2) to be engaged when the differential rotation speed of the clutch mechanism CL1 (CL2) is controlled to the predetermined differential rotation speed, cannot be generated, so that the engagement of the clutch mechanism CL1 (CL2) cannot be completed or the engagement operation takes a long time, whereby the traveling mode cannot be switched. Thus, in the embodiment of the present disclosure, the clutch mechanism CL1 (CL2) can be smoothly engaged even when the thrust of the actuator 22 decreases.

Figure 13:
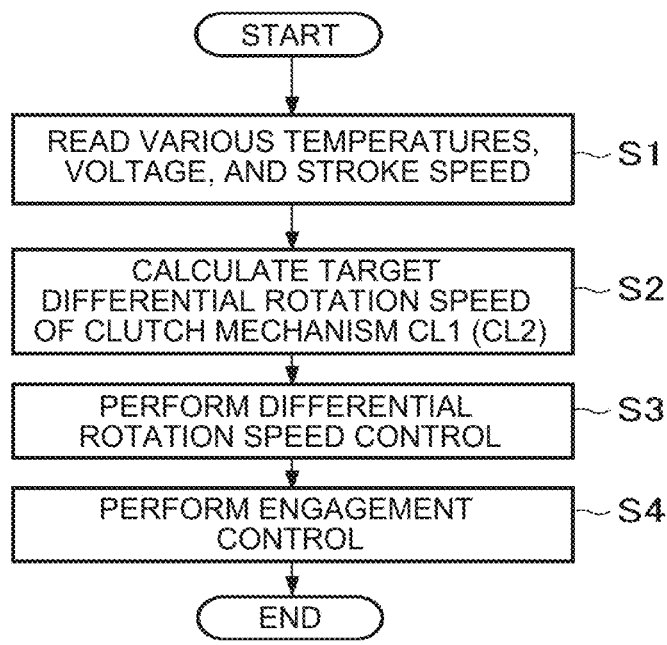
FIG. 13 is a flowchart illustrating a control example according to the embodiment of the present disclosure.

FIG. 13 is a flowchart showing an example of the control. First, the temperature of the oil (ATF) (or the temperature of each of the motors 4 and 5), the voltage of the auxiliary battery 35b, and the stroke speed of the actuator 22 are read (Step S1). This is because, as described above, each parameter such as the temperature of the oil, the voltage value of the auxiliary battery, and the stroke speed of the actuator 22 affect the thrust of the actuator 22. That is, when the temperature of the oil is higher than a predetermined temperature, the thrust of the actuator 22 decreases. Similarly, when the voltage value of the auxiliary battery 35b is lower than a predetermined value, the thrust of the actuator 22 decreases. Similarly, when the stroke speed of the actuator 22 decreases, the thrust decreases. Therefore, the parameters that affect the thrust of the actuator 22 are read. The values of the parameters can be detected by the various sensors described in FIG. 3 described above.

Then, the differential rotation speed of the target clutch mechanism CL1 (CL2) is calculated in accordance with the values of the parameters (step S2). As described above, the values of the parameters affect the thrust of the actuator 22. Therefore, when the differential rotation speed between the input side and the output side at the time of engagement of the clutch mechanism CL1 (CL2) is set to a differential rotation speed determined in advance, in the case where the values of the above parameters deviate from the predetermined values (design values), there may be a case where an engagement delay of the clutch mechanism CL1 (CL2) occurs or the clutch mechanism CL1 (CL2) cannot be engaged due to the reduction in the thrust. Thus, in step S2, the target differential rotation speed that can surely complete the engagement operation of the clutch mechanism CL1 (CL2) even when the thrust of the actuator 22 decreases is calculated.

Figure 14:
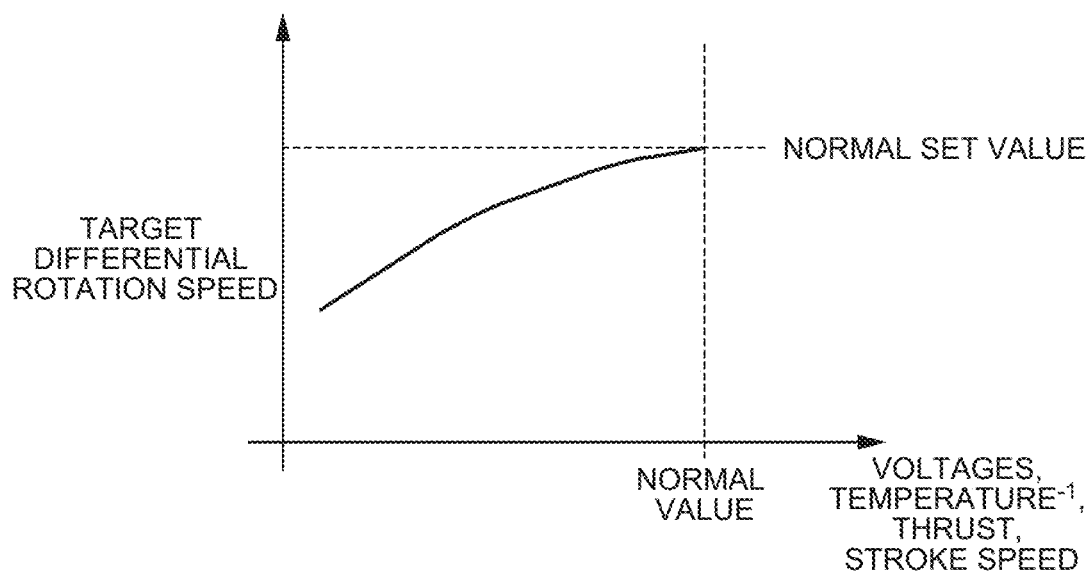
FIG. 14 is a diagram showing a map in which a target differential rotation speed is set.

The differential rotation speed may be calculated by referring to a map as shown in FIG. 14, for example. The vertical axis represents the target differential rotation speed, and the horizontal axis represents the parameters that affect the thrust of the actuator 22 (that is, the reciprocal of the oil temperature, the voltage, the thrust, and the stroke speed). As can be seen from the map, as the reciprocal of the oil temperature, the voltage, the thrust, and the stroke speed on the horizontal axis decrease from the normal values (design values), that is, the oil temperature increases, the voltage decreases, the thrust increases, and the stroke speed decreases, the target differential rotation speed also decreases. That is, the larger the amount of deviation from the normal value of each parameter indicating the state of the actuator 22, the smaller the target differential rotation speed.

When the engagement operation is performed at the normal differential rotation speed with the thrust decreased, there may be a case where the clutch mechanism CL1 (CL2) cannot be engaged because the thrust is small. For example, when the clutch mechanism CL1 (CL2) is a dog clutch, the dog teeth may interfere with each other and the engagement operation may not be performed smoothly. Thus, for example, when the temperature of the oil is higher than usual, the thrust of the actuator 22 is lower than in the normal state. Therefore, a differential rotation speed is set that is lower than usual and at which the clutch mechanism CL1 (CL2) can be engaged with the lowered thrust. That is, the target differential rotation speed shown in the map is set to the differential rotation speed at which the clutch mechanism CL1 (CL2) can be engaged with the thrust corresponding to the value of each parameter.

After the target differential rotation speed is calculated in step S2, the differential rotation speed of the clutch mechanism CL1 (CL2) is controlled so as to be the target differential rotation speed (step S3). That is, synchronous control is performed to synchronize the differential rotation speed of the clutch mechanism CL1 (CL2). Specifically, the differential rotation speed in the first clutch mechanism CL1 and the second clutch mechanism CL2 is controlled by controlling the first motor 4. Here, the control of the differential rotation speed of the clutch mechanisms CL1 and CL2 by the first motor 4 will be described. In the drive device 2 shown in FIG. 1, when the sun gear 9 is rotated by the first motor 4 while the vehicle Ve is traveling forward, the ring gear 10 and the sun gear 15 connected to the ring gear 10 rotate at a rotation speed corresponding to the rotation speed of the first motor 4, and the carrier 18 rotates at a rotation speed corresponding to the rotation speed of the sun gear 15 and the output gear 19 (ring gear 16). Since the rotating member 12b that is the driven-side member of the first clutch mechanism CL1 and the rotating member 18a that is the drive-side member of the second clutch mechanism CL2 are connected to the carrier 18, the rotation speeds of the rotating members 12b and 18a eventually become the rotation speed corresponding to the rotation speed of the first motor 4. Thus, the differential rotation speeds in the first clutch mechanism CL1 and the second clutch mechanism CL2 can be controlled by the first motor 4.

After the differential rotation speed is controlled to the target differential rotation speed in step S3, the engagement control of the clutch mechanism CL1 (CL2) to be engaged is performed (step S4). That is, the actuator 22 is stroked to bring the rotating members of the clutch mechanism CL1 (CL2) close to each other for engagement. That is, in this state, the differential rotation speed is the differential rotation speed calculated based on the value of each parameter read in step S1. Therefore, smooth engagement operation is performed.

Figure 15:
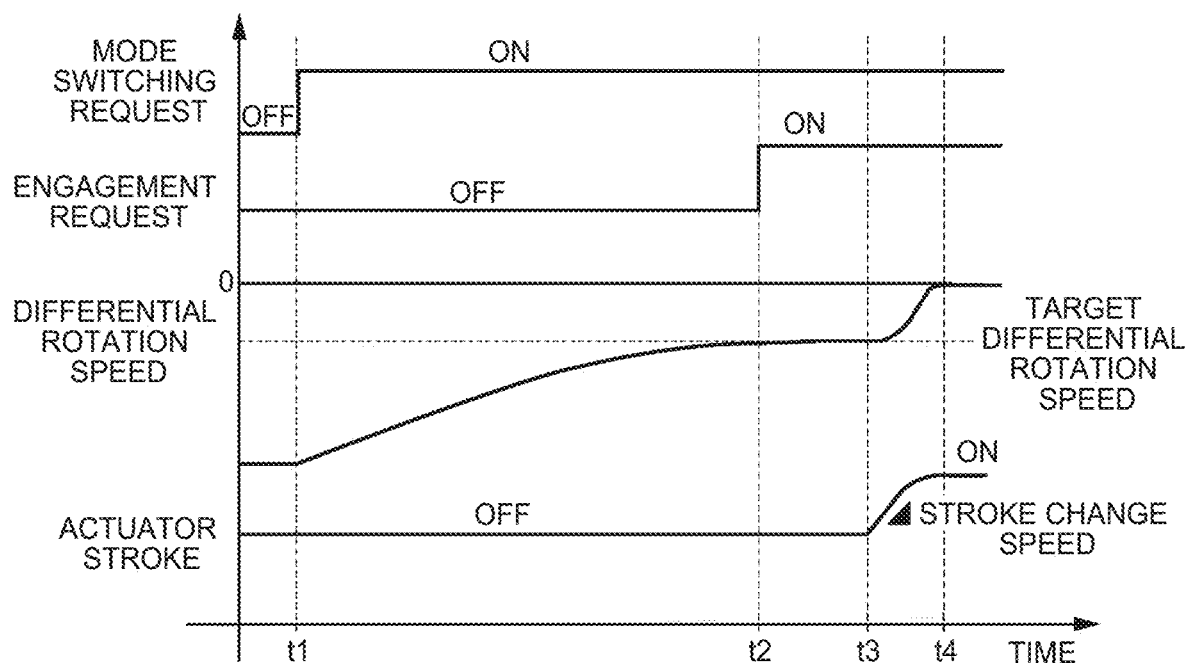
FIG. 15 is a time chart illustrating changes in parameters when the control example shown in FIG. 13 is executed.

Next, changes in the differential rotation speed and the like when the control example of FIG. 13 is executed will be described with reference to the time chart. FIG. 15 is a diagram showing the time chart, in which a traveling mode switching request, a clutch mechanism CL1 (CL2) engagement request, a clutch mechanism CL1 (CL2) differential rotation speed, and a piston stroke of the actuator 22 are shown. Further, the time chart in FIG. 15 shows an example of shifting from the state in which the vehicle is traveling in the single mode to any traveling mode in which the first clutch mechanism CL1 or the second clutch mechanism CL2 is engaged. Further, in the example shown in FIG. 15, the value of at least one of the various parameters such as the oil temperature described above deviates from the predetermined value, and the thrust of the actuator 22 has decreased. Therefore, the target differential rotation speed is also set to be smaller than usual. Hereinafter, a specific description will be given.

First, a mode switching request is made with an increase in the accelerator operation amount and the required driving force (at the time t1). That is, a request for switching from the single mode to the traveling mode in which the first clutch mechanism CL1 or the second clutch mechanism CL2 is engaged is made. Thus, at the time of t1, the differential rotation speed of the clutch mechanism CL1 (CL2) to be engaged is controlled toward the target differential rotation speed (from the time t1 to the time t2). That is, the differential rotation speed is reduced by the first motor 4. At the time t1, the differential rotation speed of the clutch mechanism CL1 (CL2) to be engaged has not reached the target differential rotation speed. Therefore, the engagement request of the clutch mechanism CL1 (CL2) and the stroke of the actuator 22 are OFF.

Then, the differential rotation speed of the clutch mechanism CL1 (CL2) controlled by the first motor 4 reaches the target differential rotation speed (at the time t2). That is, the synchronous rotation speed of the clutch mechanism CL1 (CL2) is reached. Note that the synchronous rotation speed means a differential rotation speed at which the clutch mechanism can be engaged and the shock at the time of engagement can be tolerated when the differential rotation speed between the input side and the output side of the clutch mechanism CL1 (CL2) is reduced for engagement. Thus, at the time t2, the engagement request is turned ON.

Then, when the engagement request is turned ON, the actuator 22 is controlled to engage the clutch mechanism CL1 (CL2) to be engaged (from the time t3 to the time t4). The actuator 22 is stroked to bring the drive-side member closer to the driven-side member. That is, the actuator 22 is pressed so that the rotating member 12a and the rotating member 12b are brought close to each other (or the rotating member 18a and the rotating member 18b are brought close to each other). The stroke change speed (movement speed) of the actuator 22 corresponds to the values of the various parameters that affect the thrust described above. Thus, when the change speed is larger than that shown in FIG. 15, the rate of change (slope) is large, and when the change speed is smaller than that shown in FIG. 15, the rate of change is small.

Then, at the time t4, the input side and the output side of the clutch mechanism CL1 (CL2) to be engaged are completely engaged, and the engagement of the clutch mechanism CL1 (CL2) is completed. That is, the differential rotation of the clutch mechanism CL1 (CL2) becomes "0". At the same time, the switching of the traveling mode is completed.

As described above, in the embodiment of the present disclosure, when the values of the various parameters such as the oil temperature that affect the thrust of the actuator 22 deviate from the predetermined values (design values), the differential rotation speed of the clutch mechanism CL1 (CL2) to be engaged is corrected. That is, when the values of the various parameters that affect the thrust of the actuator 22 deviate from predetermined values, the thrust may decrease. In such a case, the clutch mechanism CL1 (CL2) may not be engaged or a large engagement delay may occur. For example, when the clutch mechanism CL1 (CL2) is a dog clutch, the dog teeth on the input side and the output side of the clutch mechanism CL1 (CL2) may interfere with each other and may not be engaged. Therefore, the target differential rotation speed of the clutch mechanism CL1 (CL2) that is determined when the values of the various parameters are within the range of the predetermined values is controlled to the target differential rotation speed corresponding to the current parameter values.

That is, when the request for switching to the traveling mode in which the clutch mechanism CL1 (CL2) is engaged is made, the differential rotation speed of the clutch mechanism CL1 (CL2) is controlled to the target differential rotation speed corresponding to the current values of the various parameters. Then, when the differential rotation speed of the clutch mechanism CL1 (CL2) is controlled to the target differential rotation speed, the engagement instruction and the engagement control are performed. That is, the actuator 22 is controlled so that the input side member and the output side member of the clutch mechanism CL1 (CL2) are brought close to each other to be engaged with each other. In this case, even when the thrust of the actuator 22 has decreased, the differential rotation speed of the clutch mechanism CL1 (CL2) corresponds to the decreased thrust, so engagement of the clutch mechanism CL1 (CL2) can be performed reliably. Therefore, in the embodiment of the present disclosure, even when the thrust of the actuator 22 decreases, inconveniences such as a failure of engagement of the clutch mechanism CL1 (CL2) or a large amount of time required for the engagement operation can be suppressed. Further, since the engagement operation of the clutch mechanism CL1 (CL2) can be reliably performed as described above, the traveling mode can be smoothly switched.

Further, in the embodiment of the present disclosure, the target differential rotation speed is corrected from the normal value (design value) to engage the clutch mechanism CL1 (CL2). Therefore, for example, the differential rotation speed of the normal value is used to perform the engagement operation, so there is no need for an actuator with a large thrust to be separately provided. Therefore, it is possible to suppress restrictions in terms of mountability and cost.

Further, in the embodiment of the present disclosure, the thrust of the actuator 22 is calculated based on the existing detection data such as the oil temperature, the temperatures of the motors 4 and 5, and the voltage of the auxiliary battery 35b to calculate the target differential rotation speed of the clutch mechanism CL1 (CL2). That is, the above-described control can be performed with the existing configuration without providing a new device such as a sensor for detecting the thrust of the actuator 22.

Although the embodiment of the present disclosure has been described above, the present disclosure is not limited to the above examples, and may be appropriately modified as long as the object of the present disclosure is achieved. Although the thrust of the actuator 22 is indirectly detected using the existing parameters in the above embodiment, a sensor or the like that directly detects the thrust may be separately provided. In that case, a more accurate thrust can be detected, and the above-described control can be performed based on the thrust.

Further, the above control may be performed based on the value of at least one of the values of the parameters, or may be performed based on the values of the plurality of parameters. When the control is performed based on the plurality of parameters, the control is performed by referring to the map similar to that in FIG. 14. Using more parameters enables more accurate control.

What is claimed is:

1. A control device for an engagement mechanism, the control device comprising:
    an engagement mechanism having a first engagement element and a second engagement element that are rotatable relative to each other;
    an actuator that generates a thrust that brings the first engagement element and the second engagement element close to each other when the engagement mechanism is engaged; and
    a controller for controlling the engagement mechanism, the control device being configured to engage the first engagement element and the second engagement element with the thrust of the actuator when a differential rotation speed that is a difference between a rotation speed of the first engagement element and a rotation speed of the second engagement element is less than a predetermined value set in advance,
    wherein the controller is configured to, when the first engagement element and the second engagement element are engaged, detect a parameter indicating an operating state including the thrust of the actuator, calculate a target differential rotation speed for engagement of the first engagement element and the second engagement element in accordance with a value of the detected parameter, and control the differential rotation speed to the calculated target differential rotation speed.

2. The control device according to claim 1, further comprising:
    a sensor that detects the parameter;
    a target differential rotation speed calculation unit that calculates the target differential rotation speed; and
    a differential rotation speed control unit that controls the differential rotation speed to the target differential rotation speed,
    wherein when the first engagement element and the second engagement element are engaged, the controller detects the value of the parameter with the sensor, calculates the target differential rotation speed corresponding to the detected parameter with the target differential rotation speed calculation unit, and controls the differential rotation speed to the target differential rotation speed with the differential rotation speed control unit.

3. The control device according to claim 1, wherein the controller is configured to control the differential rotation speed to the target differential rotation speed when the value of the parameter indicating the operating state of the actuator deviates from a predetermined value set in advance.

4. The control device according to claim 3, wherein the target differential rotation speed is configured to be set to be smaller as a range in which the value of the parameter deviates from the predetermined value is larger.

5. The control device according to claim 1, wherein the parameter includes at least one parameter, out of a temperature of the actuator, a voltage of a power supply unit that operates the actuator, and a moving speed of the actuator.

6. The control device according to claim 1, wherein the engagement mechanism is a meshing clutch in which dog teeth are provided on each of the first engagement element and the second engagement element.

7. The control device according to claim 1, further comprising a first motor serving as a driving force source, wherein a rotating element of one of the first engagement element and the second engagement element is connected to the first motor and is configured such that a rotation speed changes with a change in a rotation speed of the first motor, and the first motor is controlled to control the differential rotation speed to the target differential rotation speed.

8. The control device according to claim 1, wherein:
    the engagement mechanism is mounted on a vehicle;
    the vehicle has an engine, a first motor, and a second motor as driving force sources;
    the vehicle further includes a first differential mechanism that performs a differential action with a first rotating element to which the engine is connected, a second rotating element to which the first motor is connected, and a third rotating element that outputs a torque to a drive wheel, and a second differential mechanism that performs a differential action with a fourth rotating element to which the second motor is connected, a fifth rotating element connected to the third rotating element, and a sixth rotating element;

the engagement mechanism includes a first engagement mechanism and a second engagement mechanism;

the first engagement mechanism connects the sixth rotating element and the first rotating element or releases connection of the sixth rotating element and the first rotating element, and the second engagement mechanism connects at least two rotating elements, out of the fourth rotating element, the fifth rotating element, and the sixth rotating element, or releases connection of the at least two rotating elements;

in the vehicle, a plurality of traveling modes is able to be set, the traveling modes including a first traveling mode that is set by engagement of the first engagement mechanism, a second traveling mode that is set by engagement of the second engagement mechanism and in which a torque transmitted to the drive wheel is smaller than that in the first traveling mode, and a single mode in which the first engagement mechanism and the second engagement mechanism are disengaged and the vehicle travels only with a drive torque of the second motor; and the controller is configured to
  engage the first engagement mechanism in a case of shifting from the single mode to the first traveling mode, and
  engage the second engagement mechanism in a case of shifting from the single mode to the second traveling mode.

* * * * *